United States Patent

[11] 3,630,261

| [72] | Inventor | Paul R. Gley<br>Hillsdale, N.J. |
|---|---|---|
| [21] | Appl. No. | 880,504 |
| [22] | Filed | Dec. 11, 1969 |
| [45] | Patented | Dec. 28, 1971 |
| [73] | Assignee | Rex Chainbelt Inc.<br>Milwaukee, Wis.<br>Continuation of application Ser. No.<br>708,565, Feb. 27, 1968, now abandoned.<br>This application Dec. 11, 1969, Ser. No.<br>880,504 |

[54] FRICTIONAL ANTIROTATION DEVICE
23 Claims, 23 Drawing Figs.

[52] U.S. Cl. .................................................. 151/70,
85/8.3
[51] Int. Cl. .......................................................... F16b 39/00
[50] Field of Search ........................................... 151/69, 70,
2, 8, 9, 23, 27

[56] References Cited
UNITED STATES PATENTS

| 623,124 | 4/1899 | Bailey............................. | 151/70 |
| 623,126 | 4/1899 | Bailey............................. | 151/70 |
| 733,532 | 7/1903 | Bailey............................. | 151/70 |
| 2,758,625 | 8/1956 | Poupitch ....................... | 151/9 |
| 2,853,112 | 9/1958 | Poupitch ....................... | 151/9 |
| 2,922,211 | 1/1960 | Boyd ............................. | 151/69 |
| 2,972,367 | 2/1961 | Wootton ....................... | 151/69 |
| 3,037,542 | 6/1962 | Boyd ............................. | 151/69 |

*Primary Examiner*—Edward C. Allen
*Attorney*—Shenier and O'Connor

ABSTRACT: A fastener assembly in which a nut is adapted to be threaded onto a stud so as to travel along the length thereof from a point of initial engagement of the threads and in which interengageable means on the stud and on the nut and independent of the threads provide a relatively high frictional antirotation force from a point adjacent the point of initial engagement and over the length of travel of the nut on the stud, thus securely to hold two members in assembled relationship.

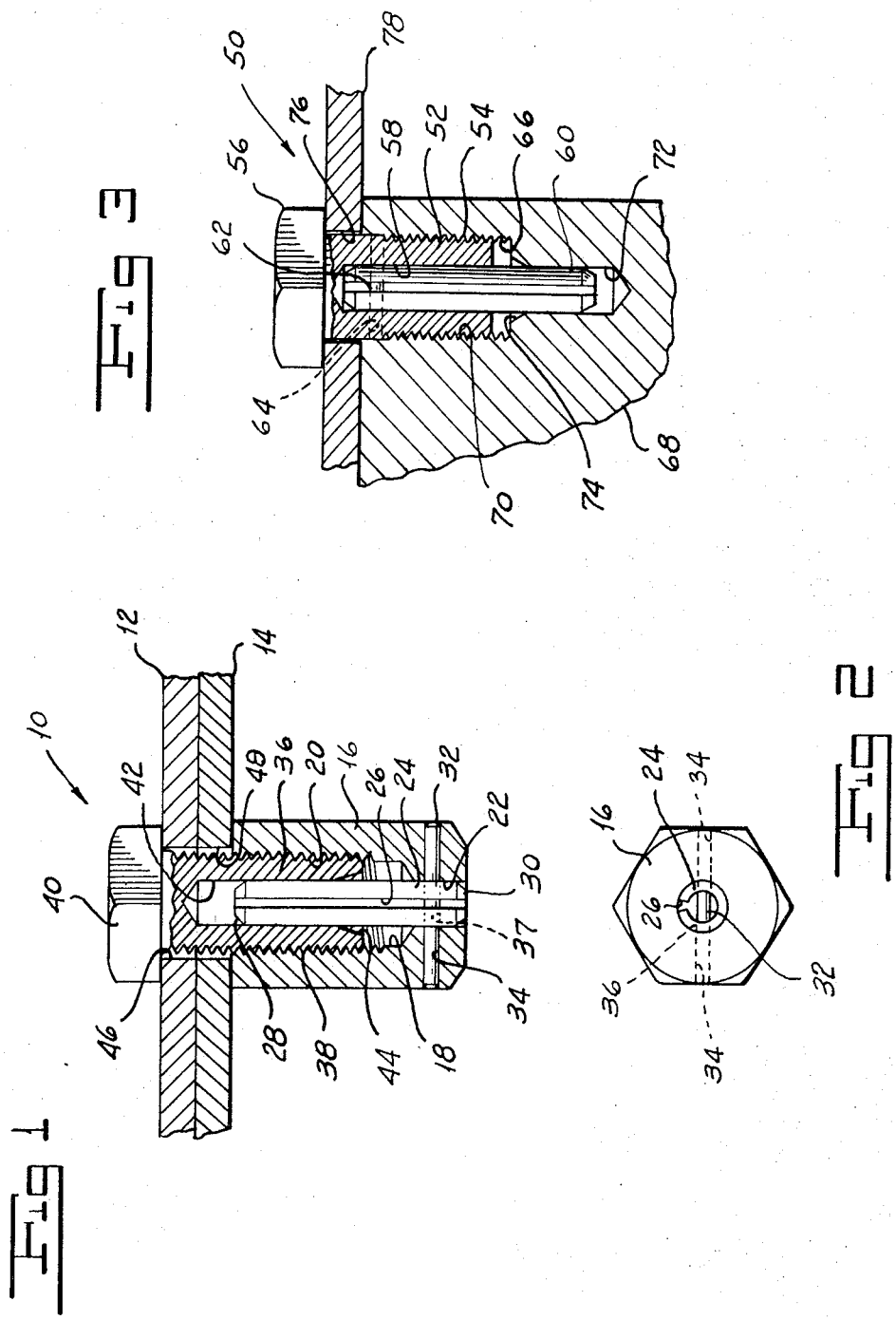

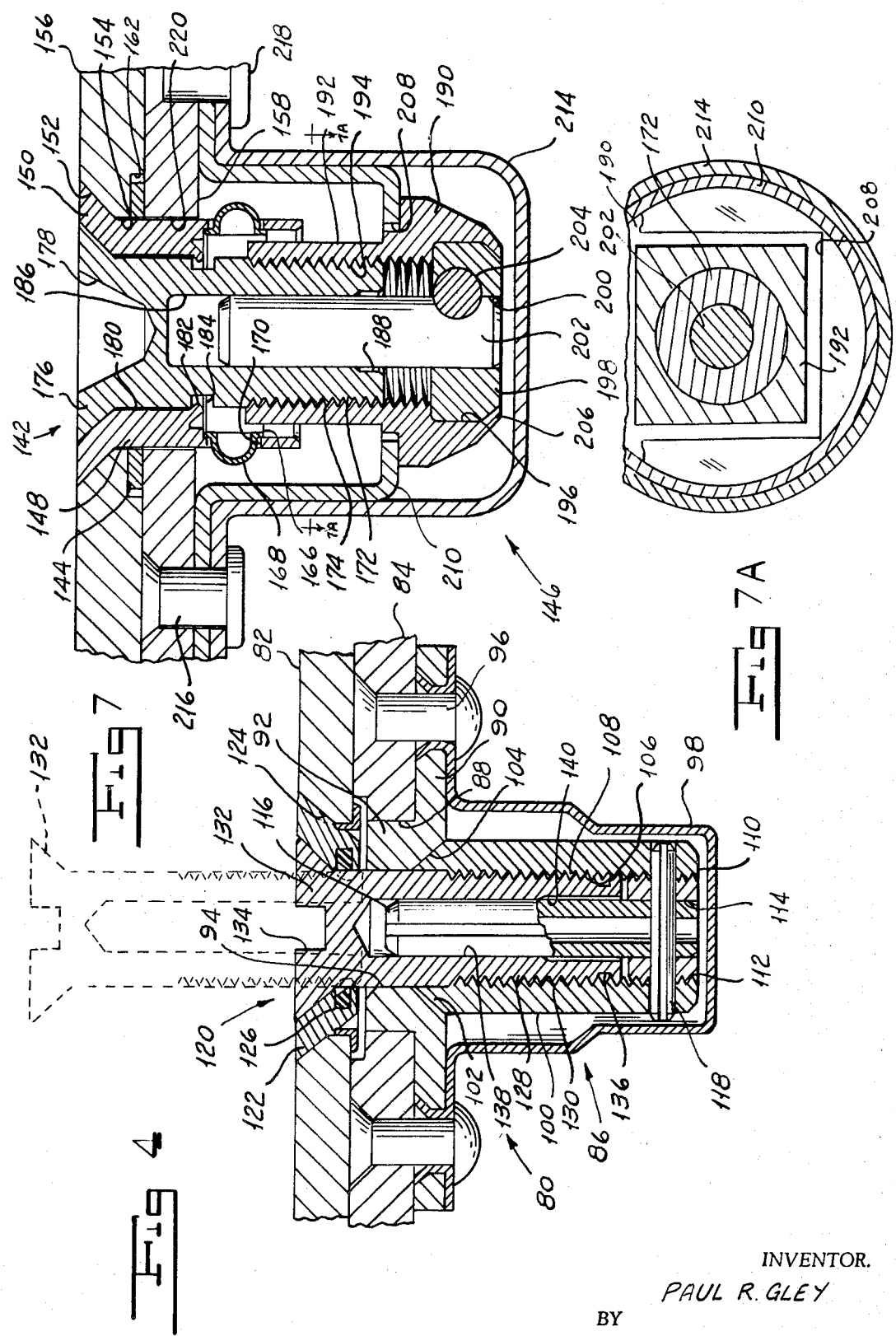

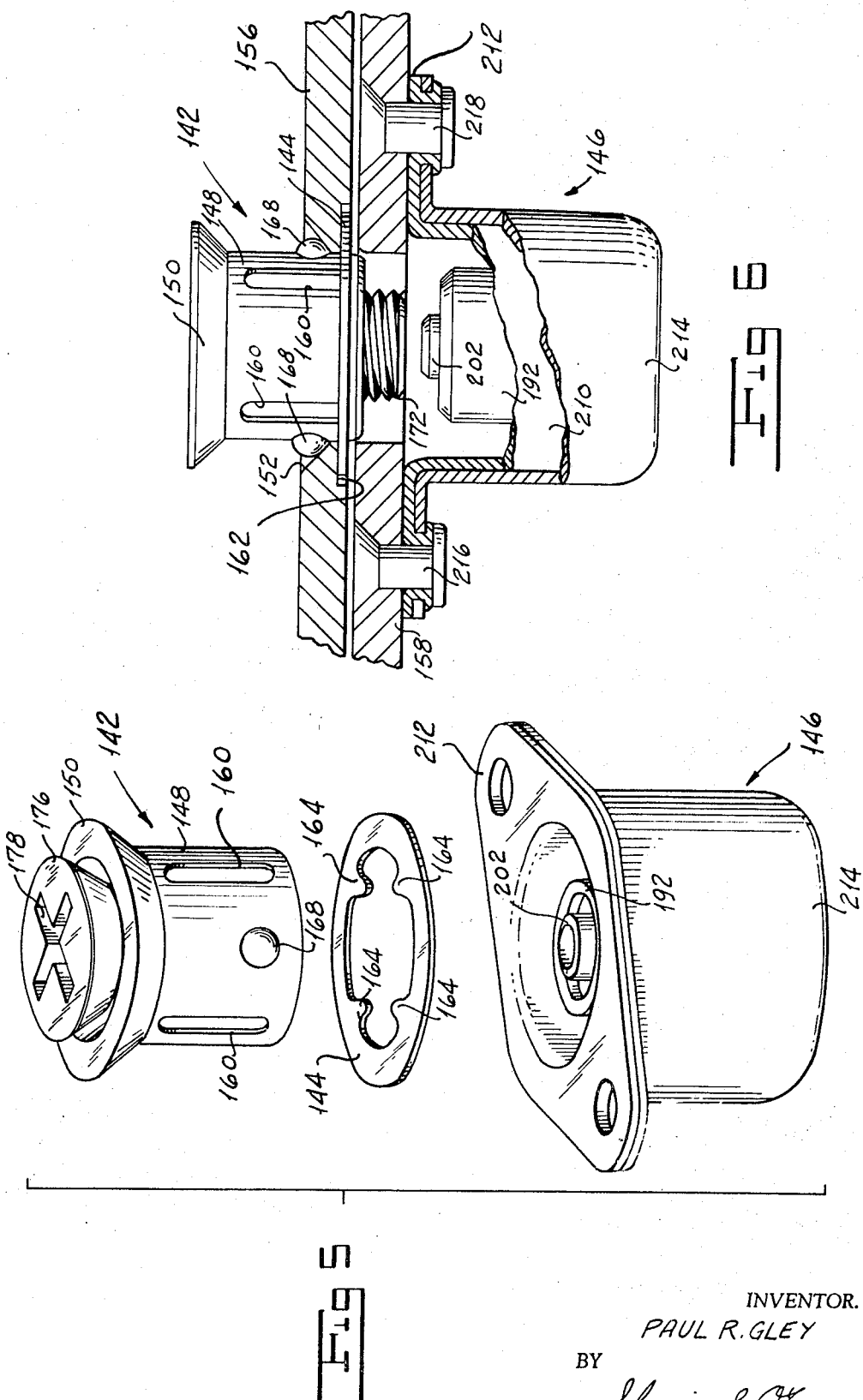

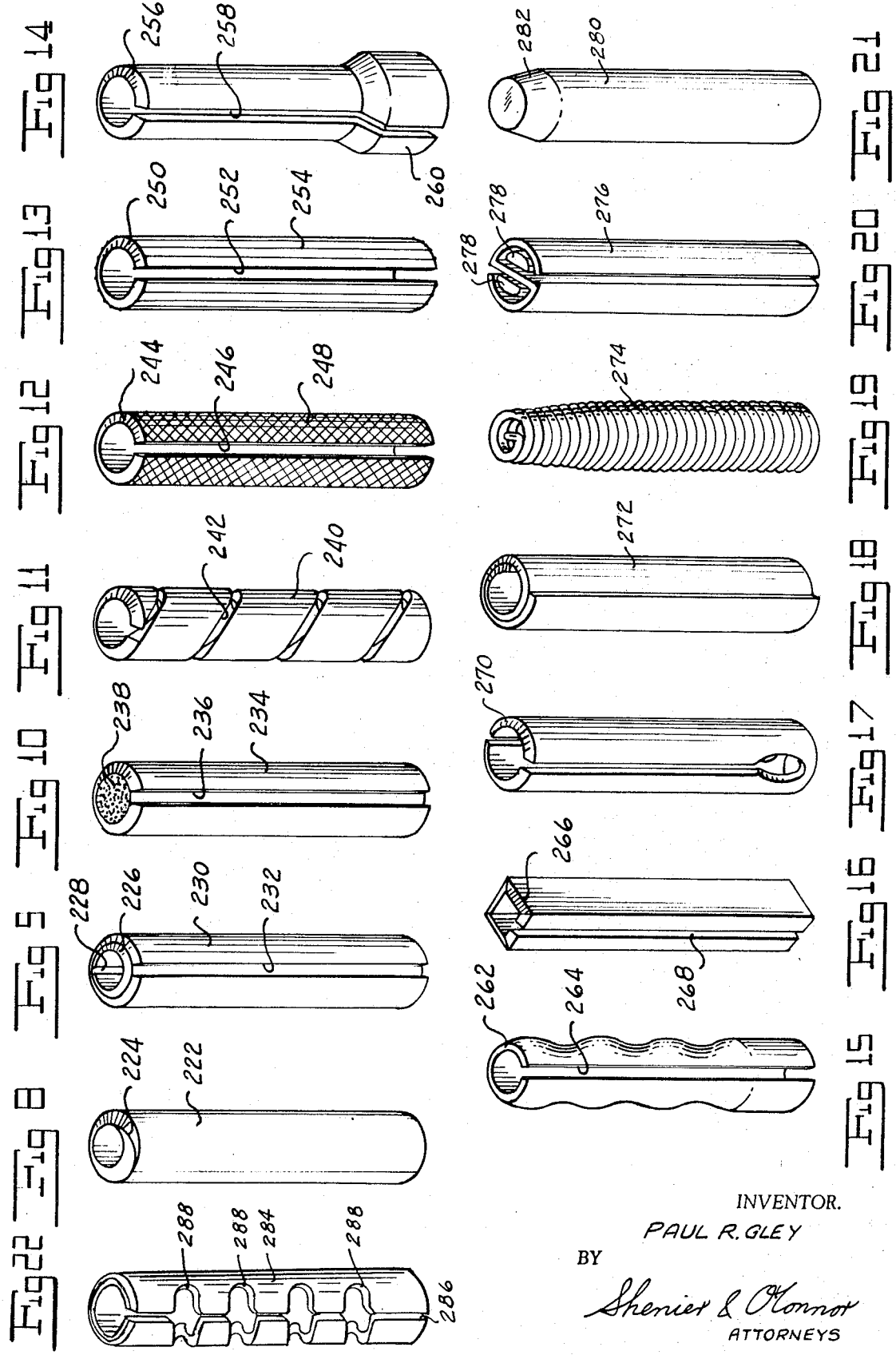

FRICTIONAL ANTIROTATION DEVICE

This application is a continuation of my copending application Ser. No. 708,565 filed Feb. 27, 1968, now abandoned.

BACKGROUND OF THE INVENTION

Many installations such, for example, as stressed panels which are to be assembled over openings in a missile body or the like, require threaded fasteners which are frictionally "locked up" or restrained against rotary movement by a relatively large frictional force. This is necessary in order that the fasteners not become loosened when subjected to vibrations. In order to achieve this end in the prior art, the fasteners are tightened with an amount of torque sufficient to produce the required resistance to vibration. Particularly, Vander Sande et al. U.S. Pat. No. 3,221,589 shows a fastener of this type in which, when the fastener elements have been threaded together far enough to bring the panel into engagement with the frame, a cam surface on a ring around the nut and between the stud cage and the frame engages spring tabs to cam them inwardly into frictional engagement with the outer surface of the nut. The force producing the camming action is applied directly to the fastener threads. Tightening this fastener sufficiently to cause the friction tabs to engage the outer surface of the nut with sufficient force to lock up the fastener subjects the threads to an extremely high stress.

Fasteners for use in installations of the type described above must be able to be undone and refastened a number of times to permit the panel to be removed for access to the space enclosed thereby. Owing to the fact that the threads of the fastener are subjected to an extremely high stress for locking up, they are distorted in use of the fastener so that the assembly has a relatively short life requiring relatively frequent replacement of the assembly. I have discovered that the useful life of a fastener of this type is only of the order of 15 operations of undoing and redoing of the fastener. Other fasteners using frictional devices, such as distorted threads, which bear directly on the threads, similarly have a relatively short life owing to the high stresses produced thereby.

I have invented a frictional antirotation device for a fastener which overcomes the defects inherent in fastener assemblies of the prior art. A fastener assembly incorporating my frictional antirotation device has a very long life. It can withstand thousands of unfastening and refastening operations without distorting the threads of the fastener. It is extremely simple in construction for the result achieved thereby. Preferably, for fast operation, I employ quadruple threads. Where speed of operation is not important, I may of course use single or double threads. My fastener locks up in less than two turns and provides a positive frictional lock in an infinite number of relative positions.

SUMMARY OF THE INVENTION

One object of my invention is to provide a frictional antirotation device for use in a fastener to overcome the defects of fasteners of the prior art.

Another object of my invention is to provide a fastener having positive frictional locking in an infinite number of positions.

A further object of my invention is to provide a frictional antirotation device which permits thousands of cycles of unfastening and refastening of a fastener.

Still another object of my invention is to provide a frictional antirotation device which is extremely simple in construction and in operation.

Other and further objects of my invention will appear from the following description.

In general my invention contemplates the provision of a frictional antirotation device for use in a fastener comprising interthreaded fastener members adapted to be threaded over a length of travel from a point of initial engagement of the threads wherein frictionally interengageable elements on the threaded elements and independent of the threads provide a very high frictional antirotation force from a point adjacent the point of initial engagement of the threads.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of one form of fastener assembly incorporating my frictional antirotation device.

FIG. 2 is a bottom plan view of the fastener assembly shown in FIG. 1.

FIG. 3 is a sectional view of another form of fastener incorporating my frictional antirotation device.

FIG. 4 is a sectional view of a still further form of a fastener incorporating my frictional antirotation device.

FIG. 5 is an exploded view of yet another form of fastener assembly incorporating my frictional antirotation device.

FIG. 6 is an elevation with parts broken away and with other parts shown in section of the form of fastener illustrated in FIG. 5 with the fastener parts out of operative engagement.

FIG. 7 is a sectional view of the fastener assembly shown in FIG. 6 with the parts in operative engagement.

FIG. 7A is a fragmentary sectional view of the fastener assembly shown in FIG. 7, taken along the line 7A—7A of FIG. 7.

FIG. 8 is a perspective view of an alternate form of friction element which I may employ in my frictional antirotation device.

FIG. 9 is a perspective view of a further form of friction element which I may employ in my frictional antirotation device.

FIG. 10 is a perspective view of another form of friction element which I may employ in my frictional antirotation device.

FIG. 11 is a perspective view of yet another form of friction element which I may employ in my frictional antirotation device.

FIG. 12 is a perspective view of a still further form of friction element which I may employ in my frictional antirotation device.

FIG. 13 is a perspective view of another form of friction element which I may employ in my frictional antirotation device.

FIG. 14 is a perspective view of a further form of friction element which I may employ in my frictional antirotation device.

FIG. 15 is a perspective view of a still further form of friction element which I may employ in my frictional antirotation device.

FIG. 16 is a perspective view of yet another form of friction element which I may employ in my frictional antirotation device.

FIG. 17 is a perspective view of a still further form of friction element which I may employ in my frictional antirotation device.

FIG. 18 is a perspective view of yet another alternate form of locking element which I may employ in my frictional antirotation device.

FIG. 19 is a perspective view of a further alternate form of spring pin which I may employ in my frictional antirotation device.

FIG. 20 is a perspective view of a still further alternate form of spring locking pin which I may employ in my frictional antirotation device.

FIG. 21 is a perspective view of another alternate form of locking element which I may employ in my frictional antirotation device.

FIG. 22 is a perspective view of a still further form of locking element which I may employ in my frictional antirotation device.

DESCRIPTION OF THE PREFERRED EMBODIMENTS

Referring now to FIGS. 1 and 2, I have shown one embodiment of a fastener assembly, indicated generally by the reference character 10, for securing a panel or the like 12 to a frame 14 which may be provided with an opening adapted to be covered by the panel 12. In this embodiment of my invention I provide a self-locking nut 16 having a central bore 18 and having a generally hexagonal cross-sectional shape. Bore 18 is provided with threads 20 extending along the length thereof. I provide an opening 22 through the base of the nut leading into the bore 18. Opening 22 is adapted to receive the friction element 24 of the assembly 10. In the particular embodiment of my fastener illustrated in FIGS. 1 and 2, the friction element is a generally cylindrical spring pin having a slot 26 extending through the pin wall and along the entire length of the pin 24. I provide the friction pin 24 with tapered ends 28 and 30. In assembling the friction pin 24 with the nut 16 I insert the end 30 of the pin in the opening 22 and retain the pin in position in the nut by means of a small spring pin 32 which extends through aligned bores 34 in the base of the nut and through aligned openings 37 in the wall of the pin. In this manner I secure the friction pin 24 in assembled relationship with the nut 16.

The other element of the form of fastener illustrated in FIGS. 1 and 2 is a bolt 36 having a shank provided with threads 38 and with a generally hexagonal head 40. I form the bolt 36 with an axially extending central bore 42 having a flared mouth 44 at the lower open end of the bore for guiding the friction pin into the bore in a manner to be described.

In applying the panel 12 to the frame 14 by means of the fastener 10, I insert the bolt 36 through aligned openings 46 and 48 in the panel 12 and in the frame 14. With the parts in this position I begin to thread the nut 16 and the bolt 36 together. As the parts are brought together, the end 28 of the friction pin 24 enters the mouth 44 of the bolt bore 42. As soon as the threads engage, the pin 24 is in frictional engagement with the wall of the bore 42. I so construct the pin and the bore that I provide a relatively high frictional antirotation force as soon as the nut and bolt have been relatively rotated through only a couple of turns from the point of initial engagement of the threads. In this manner the fastener 10 is frictionally "locked up" after only a short distance from the point of initial engagement of the threads of the nut and the bolt. This frictional force is sufficient to cause the fastener to withstand extremes of vibration without disengagement. The force moreover is independent of the stress in the threads since it is provided by the spring pin 24 and the inner surface of the bore 42. The form of my spring pin 24 shown in FIGS. 1 and 2 may be formed of any suitable material such, for example, as spring steel.

Referring now to FIG. 3, I have shown an alternate form of fastener, indicated generally by the reference character 50, in which the friction locking pin is carried by the bolt of the assembly. This form of fastener includes a bolt 52 having threads 54 along its shank and having a head 56 which may, for example, be generally hexagonal. I form the bolt 52 with an axially extending bore 58 adapted to receive a spring pin 60 which may be the same as the pin 24 shown in FIG. 1 or which may be of any of the other forms of locking element to be described hereinafter. A smaller spring pin 62 extending through bores 64 in the shank of the bolt 52 and through aligned openings in the wall of the friction locking pin 60 retain the pin in position in the bore 58.

In the form of my fastener illustrated in FIG. 3, by way of example I have shown the bolt 52 in cooperative relationship with a blind hole 66 in a body 68. The hole 66 has threads 70 adapted to cooperate with the threads 54 of the bolt 52. A countersunk bore 72 having a flared mouth 74 extends into the body 68 from the bottom of the hole 66. With the opening 76 of a panel 78 or the like aligned with the hole 66, bolt 52 is inserted through the opening 76 and into the hole 66 to bring the threads 54 into operative relationship with threads 70. In the course of this movement, the lower tapered end of the friction locking pin 60 enters the bore 72 through the mouth 74. With the parts in this relative position, pin 60 engages the wall of the bore 72 after only a relatively small relative rotation of the parts following initial engagement of the threads so as to provide a relatively high frictional locking force without excessively stressing the threads.

Referring now to FIG. 4, I have shown yet another, more sophisticated, form of fastener, indicated generally by the reference character 80, for holding a panel or the like 82 in assembled relationship on a frame or the like 84. The fastener 80 includes a friction locking nut subassembly, indicated generally by the reference character 86, adapted to be assembled in operative relationship with an opening 88 in the frame 84. The subassembly 86 includes an adapter 90 having a central boss 92 adapted to fit in the opening 88 and having a hole 94 for receiving the bolt in a manner to be described. Any suitable means such, for example, as rivets 96 may be employed to hold a nut-retaining cage 98 and the adapter 90 in assembled relationship on the frame 84. The nut 100 of the subassembly 86 has a tapered end 102 adapted to cooperate with a counterbore 104 around the hole 94 when the fastener is drawn tight.

I provide nut 100 with an axially extending bore 106 having threads 108 along a portion of the length thereof. The lower portion 110 of bore 106 receives a plug 112 having an opening 114 for the friction locking pin 116 of this assembly. A smaller locking spring pin 118 extends through the wall of the nut, through the plug 112 and through the wall of the pin 116 to secure the pin in operative relationship with the nut.

The stud subassembly, indicated generally by the reference character 120, of this form of my fastener includes a grommet 122 secured in operative relationship with a counterbored opening 124 in the panel 82 by any suitable means known to the art. Grommet 122 is provided with an annular recess for receiving a retainer ring 126. The bolt 128 of this form of my fastener has external threads 130 adapted to cooperate with the internal threads 108 of the nut 100. The head 132 of the bolt is provided with a suitable slot 134 for the reception of a tool, such as a screwdriver or the like. I form the lower end of the bolt 128 with a circumferential groove 136 into which ring 126 snaps when the bolt is at its outer limit of travel so as to prevent the bolt from falling away from the panel 82.

The bolt 128 has an axially extending bore 138 provided with an enlarged mouth 140. As the fastener elements are drawn together the friction pin 116 enters the bore 138 through the mouth 140. I so construct the parts that the pin 116 and the wall of the bore 138 cooperate to provide a relatively high frictional antirotation or "locking-up" force after only a relatively small movement of the bolt 128 and nut 100 together from the point of initial engagement of the threads 108 and 130.

Referring now to FIGS. 5 to 7 of the drawings, I have shown a further form of my fastener employing my frictional antirotation device. The form of my fastener shown in these Figures includes a screw assembly, indicated generally by the reference character 142, a screw assembly retaining ring 144, and a receptacle assembly, indicated generally by the reference character 146. The screw assembly 142 includes an outer bushing 148 having a head 150 adapted to be received in the counterbore 152 of an opening 154 in one of the members such as a panel 156 adapted to be assembled onto a frame 158 or the like. I form the wall of the bushing 148 below the head 150 with a plurality of spaced, vertically extending slots 160. The retaining ring 144 which normally rests in an annular groove 162 in the underside of the panel 156 is provided with a plurality of radially inwardly extending resilient tongues 164 spaced around the inner periphery of the ring correspondingly to the slots 160. To apply the screw assembly 142 to the panel 156, the retaining ring 144 is placed in the recess 162 and the screw assembly 142 is pushed in through the opening 154 until the tongues 164 ride into the slots 160 so as to retain the screw assembly 142 on the panel 156. I dispose a resilient ring 166 within the bushing 148. I form ring 166 with a pair of detents 164 which normally are urged radially outwardly through holes 170 in the wall of the bushing. When the screw assembly 142 has been assembled in the opening 154 in the manner described above, it will be releasably held in a retracted position under the action of the detents 168 in engagement with the outer surface of the panel.

The assembly 142 includes a screw 172 having external threads 174 along the length thereof and having a head 176 provided with an opening 178 of any suitable type for receiving a tool (not shown) to permit the screw to be driven. Screw 172 is received in the bore 180 of the bushing. I provide the bushing with an annular internal lip or tongue 182 extending inwardly from the wall of the bore 180 into a circumferential groove 184 on the outer surface of the screw 172. Lip 182 and groove 184 cooperate to ensure that the bushing 148 moves with the screw 172 as the latter is screwed in and retracted. I provide the screw 172 with an axially extending bore 186 having an enlarged mouth 188 for the reception of the friction locking pin to be described hereinbelow.

The form of the receptacle assembly 146 shown in FIGS. 5 to 7 includes a nut having a head 190 and a shank 192 having internal threads 194 adapted to cooperate with the external threads 174 of the screw 172. I form the head 190 with a recess 196 for receiving a plug 198 having a bore 200 which receives one end of the friction locking pin 202 which may be of any of the forms described hereinabove or to be described hereinbelow. Plug 198 receives a locking pin 204 for securing pin 202 to the plug. I may retain the plug 198 in the recess 196 by any suitable means such, for example, as by upsetting an edge 206 of the recess.

The shank 192, which may for example be square, extends through a square opening 208 in a nut stop 210 having laterally extending base portions 212. The nut 190 while having limited movement in all directions is restrained against rotation relative to frame 158 and is retained thereon by a combined cage and dust cover 214 having laterally extending base portions 216. Any suitable means, such as rivets 218 or the like, may be employed to hold the cover 214 and the stop 210 in assembled relationship with the frame 158 over the frame opening 220.

Referring now to FIGS. 8 to 21, I have shown other various forms of friction locking element which may be employed with the forms of fastener described hereinabove. FIG. 8 illustrates a generally tubular spring pin or friction locking element 222 which may have a spiral wall slit 224 forming feathered edges on the tube 222 at the slit. This is distinguished from the form of locking pin illustrated in FIGS. 1 and 2 having a straight slot 58 which might of course be tapered.

FIG. 9 shows a compound friction locking element in which an inner tubular member 226 having a longitudinal slot 228 extending throughout its length is nested within an outer tubular member 230 having a slot 232 extending throughout the length of its wall. Preferably I dispose the slots 228 and 232 at diametrically opposite locations on the assembly.

The member 234 shown in FIG. 10 is tubular and has a wall slot 236. This member, however, is provided with a core 238 of a suitable resilient material such as a plastic or the like.

FIG. 11 illustrates yet another member 240 which is formed with a helical wall slot 242. Preferably the direction in which the slot 242 extends with relation to the direction of the screw threads of the fastener is such that the fastener is relatively easy to turn down but is relatively difficult to retract.

FIGS. 12 and 13 respectively show a tubular element 224 having a slot 246 and provided with a knurled outer surface 248 and an element 250 having a slot 252 and provided with a serrated outer surface 254.

The form of element 256 shown in FIG. 14 is generally tubular and has a slot 258. I provide this member 256 with an enlarged base 260 which replaces the plug, such as the plug 112 in FIG. 3 or the plug 198 in FIG. 7, to facilitate assembly of the friction element. The slot 258 may extend throughout the entire length of the element 256 or it may terminate at a location above the base. Moreover, more than a single slot might be provided. I may form the element 256 from sheet material or, alternatively, it might be machined. The slot 258 may be straight or, if desirable, in some applications it may be tapered.

In FIG. 15 I have shown a generally tubular friction locking element 262 having a longitudinally extending slot 264 in its wall and so shaped as to have a varying diameter along the length thereof. FIG. 16 shows a noncircular cross-sectional shape friction element 266 having a wall slot 268. The element 270 shown in FIG. 17 is generally U-shaped and may readily be formed from sheet metal.

FIG. 18 illustrates a friction locking element 272 having a spiral or coillike cross-sectional shape. With this configuration the direction of the coil from inside to outside is so selected as to be the same as the direction of rotation of the fastener element which rotates relative thereto during a fastening operation. In this way, the parts can be made relatively easy to fasten and relatively more difficult to unfasten.

FIG. 19 shows a form of my friction locking element 274 which is coiled from a length of wire and which is formed with a tapered free end. As in the form of my locking element shown in FIG. 18, the element 274 affords an "easy in-hard out" action.

FIG. 20 illustrates another modification of my friction locking element 276 which is S-shaped in cross section. Fillers 278 of a resilient material may be provided. This element also is so oriented as to give "easy in-hard out" action.

In FIG. 21 I have shown a solid friction locking pin 280 having a tapered end 282. This pin is formed of a material having inherent elasticity. For example, it may be made from fibrous material or from nylon or the like. FIG. 22 shows an element 284 which is tubular and which has a longitudinal wall slot 286. I provide this element with transverse wall slots 288.

It is to be understood that the various form of friction locking element which I have described are by way of example, it being understood that I may employ any variation or modification which will provide the desired high frictional force when the fastener is locked up. Various materials, including those mentioned hereinabove, may be used to form the spring locking pin. Spring steel and similar materials are appropriate for some forms of my pin. Other materials, such as nylon and fibrous materials, may be suitable for other forms of the locking element. It will be appreciated also that the locking force provided may be predetermined by selection of the material employed for the pin as well as its construction and its diameter relative to the diameter of the pin-receiving bore. The "easy in-hard out" feature may be provided if desired.

In operation of the form of my fastener shown in FIGS. 1 and 2, the bolt 36 and the nut 16 are brought into operative relationship with the bolt extending through the aligned openings 46 and 48 in the panel 12 and the frame 14. As the external threads 38 and the internal threads 20 are brought into operative relationship, the end 28 of the friction locking pin 24 enters the mouth 44 and the pin begins to engage the wall of the bore 42. Now, as the bolt and nut are turned relative to each other, after a very small relative movement the engagement of the pin 24 with the wall of bore 42 provides a relatively high frictional antirotational force. This force is maintained over the entire length of travel of the bolt 36 relative to the nut 16. In effect, it provides a positive frictional "locking-up" action in all relative positions of the fastener elements. Owing to this force, the fastener will not accidentally become undone. This force is moreover provided without excessively stressing the threads of the fastener. As contrasted with fasteners known in the prior art which are capable of only about 15 or so cycles of operation, my fastener can be done and undone thousands of times without damage.

The operation of the form of my fastener shown in FIG. 3 is analogous to that of the fastener shown in FIGS. 1 and 2. The two forms of fastener differ structurally in that the friction locking pin 60 of the form of my fastener shown in FIG. 3 is carried by the bolt rather than by a nut. As the threads 54 and 70 of this form of my fastener engage, pin 60 begins to engage the wall of bore 72 so that a high frictional antirotation force is provided after only a small relative movement of the fastener elements.

The fastener shown in FIG. 4 operates in a manner similar to that described in connection with FIGS. 1 and 2. This form of my fastener differs in that the nut 100 is held captive by the cage 98 and I provide means for preventing the screw 128 from falling away from panel 82. In the form of fastener shown in FIGS. 5 to 7, the retaining ring 64 holds the screw assembly 142 on the panel 156 for movement between its retracted and its screwed-in positions. The detents 168 releasably hold the screw assembly in its retracted position for operation when desired.

It will be appreciated that any of the various forms of my friction locking element shown in FIGS. 8 through 21 may be adapted to the various forms of fasteners illustrated in FIGS. 1 to 7.

It will be seen that I have accomplished the object of my invention. I have provided a frictional antirotation device for use in a fastener to overcome the defects of fasteners of the prior art. My device frictionally locks up a threaded fastener without excessively stressing the threads of the fastener. A fastener incorporating my device has an extremely long life. It can be unfastened and refastened thousands of times without wearing out. It is extremely simple in its construction and in its operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An assembly for mounting a fastener in a hole on a panel including in combination, a bushing disposed in said hole, a fastener disposed in said bushing, means operatively connecting said bushing and said fastener for concomitant axial movement and for relative rotary movement, means for limiting movement of said bushing relative to said panel to movement between a retracted position and an extended position, a ring of resilient material housed by said bushing, and detents formed in said ring, openings in the wall of said bushing through which said detents extend, said detents extending beyond the edge of said hole in the extended position of the bushing releasably to hold the bushing in its extended position.

2. An assembly as in claim 1 in which said limiting means comprises a retaining ring surrounding said bushing, said bushing provided with longitudinally extending slots and projections on said retaining ring extending into said slots.

3. A fastener assembly including in combination a first elongated member having external threads along the length thereof, a second member provided with a generally cylindrical recess having a wall and having internal threads in said wall, said members being threadably interengageable over a length of travel from a point of initial engagement of said threads in response to relative rotation of said members around an axis; a generally cylindrical spring pin having a diameter less than that of said recess, and less than the minor diameter of said internal threads, means securing said pin to one of said members for movement therewith, and a generally cylindrical bore in the other member for receiving said pin, said bore having a diameter less than that of said recess and less than the minor diameter of said internal threads, said pin and said bore extending in the direction of said axis and being coaxial therewith, said bore having a diameter less than that of said pin to cause said pin frictionally to engage the wall of said bore in response to threaded interengagement of said members, one of said pin and said bore having a tapered portion facilitating entry of said pin into said bore.

4. A fastener assembly including in combination a first elongated member having external threads along the length thereof, a second member provided with a recess having a wall and having internal threads in said wall, said members being threadably interengageable over a length of travel from a point of initial engagement of said threads in response to relative rotation of said members around an axis, a first generally cylindrical bore in said first member, a second generally cylindrical bore in the base of said recess in said second member, said second bore being of smaller diameter than said recess, said bores extending in the direction of said axis and being coaxial therewith, a generally cylindrical spring pin elongated in the direction of said axis and means for securing said spring pin in one of said bores with a length thereof extending out of the bore, said other bore having a diameter less than said spring pin to cause said pin frictionally to engage the wall of the other bore in response to threaded interengagement of said members.

5. An assembly as in claim 4 in which said length of said spring pin relative to the length of said recess is such that said frictional engagement takes place only upon engagement of said threads.

6. An assembly as in claim 4 in which the end of one of said pin length and said other bore is tapered to facilitate entry of said pin into said other bore.

7. An assembly as in claim 4 in which said pin is secured in the bore of said first member.

8. An assembly as in claim 4 in which said pin is secured in the bore of the second member.

9. An assembly as in claim 4 in which said pin is a tubular element of resilient material having a single axially extending slit through the length of the wall thereof.

10. A fastener assembly as in claim 4 in which said pin has tapered ends.

11. A fastener assembly as in claim 4 in which said other bore is formed with an enlarged mouth.

12. A fastener assembly as in claim 4 in which said pin is tubular and in which said pin has a helical slot extending throughout the length of the wall thereof, the direction of said helical slot being opposite to the direction of said threads.

13. An assembly as in claim 4 in which said pin is tubular, said pin having a spiral slit extending through the wall thereof over the length of said pin, said slit forming feathered edges.

14. An assembly as in claim 4 in which said pin is tubular, said pin having a slit extending through the wall thereof over the length thereof and a tubular element nested within said pin, said tubular element having a slit through the wall thereof over the length thereof.

15. An assembly as in claim 4 in which said pin is tubular, said pin having a longitudinal slit in the wall thereof and a core of resilient material in said pin.

16. A fastener as in claim 4 in which said pin is provided with a plurality of slits extending partially along its length to form a cantilever spring.

17. An assembly as in claim 4 including an enlarged base on said pin to facilitate mounting of said pin in said one bore.

18. An assembly as in claim 4 in which said pin has a spiral transverse cross-sectional shape.

19. An assembly as in claim 4 in which said pin is wound from resilient wire.

20. An assembly as in claim 4 in which said pin has a generally S-shaped transverse cross-sectional configuration.

21. An assembly as in claim 20 including fillers of resilient material in the curves of said S-shaped pins.

22. An assembly as in claim 4 including means for mounting said first member in a hole on a panel, said mounting means comprising a bushing disposed in said hole, said first member being disposed in said bushing, means operatively connecting said bushing and said first member for concomitant axial movement and for relative rotary movement, means for limiting movement of said bushing relative to said panel to movement between a retracted position and an extended position, a ring of resilient material housed by said bushing and detents formed in said ring, openings in the wall of said bushing through which said detents extend, said detents extending beyond the edge of said hole in the extended position of the bushing releasably to hold the bushing in its extended position.

* * * * *